(12) United States Patent
Yamamoto et al.

(10) Patent No.: US 7,865,903 B2
(45) Date of Patent: *Jan. 4, 2011

(54) PROCESSING MESSAGES OF AGENTS

(75) Inventors: Gaku Yamamoto, Tokyo (JP); Teruo Koyanagi, Yokohama (JP); Yoshiaki Kobayashi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/143,976

(22) Filed: Jun. 23, 2008

(65) Prior Publication Data

US 2008/0263567 A1      Oct. 23, 2008

Related U.S. Application Data

(63) Continuation of application No. 11/319,893, filed on Dec. 28, 2005, now Pat. No. 7,421,703.

(30) Foreign Application Priority Data

Dec. 28, 2004    (JP) ............................. 2004-380864

(51) Int. Cl.
  *G06F 13/00*    (2006.01)

(52) U.S. Cl. ................ 719/317; 719/313; 719/314; 718/100; 718/102; 718/103

(58) Field of Classification Search ................. 719/317, 719/313, 314; 718/100, 102, 103
See application file for complete search history.

(56) References Cited

U.S. PATENT DOCUMENTS 6,490,611 B1 *  12/2002  Shen et al. .................. 718/103
7,356,820 B2 *   4/2008  Bower, III .................. 718/103

* cited by examiner

*Primary Examiner*—Andy Ho
(74) *Attorney, Agent, or Firm*—Vazken Alexanian

(57) ABSTRACT

This invention provides methods, systems and apparatus for processing a message of a large number of agents. An example of an apparatus includes: a memory; means for managing a state of an agent based on whether the agent is in the memory and whether there is a message, by determining a priority level of the agent based on a message inserted into the agent; means for assigning a thread to the agent if the agent is in the memory and for assigning a thread to the agent after calling the agent to the memory if the agent is not in the memory, on condition that the agent having a highest priority level has been detected; and message processing means for repeating message processing until a predetermined criterion is satisfied, in relation to the agent to which a thread has been assigned.

20 Claims, 10 Drawing Sheets

| RUNNING | AGENT IS ASSIGNED THREAD |
|---|---|
| IN_FILLED | AGENT EXISTS IN CACHE, AND MESSAGE EXISTS IN MESSAGE QUEUE |
| IN_EMPTY | AGENT EXISTS IN CACHE, AND MESSAGE QUEUE IS EMPTY |
| OUT_FILLED | AGENT DOES NOT EXISTS IN CACHE, AND MESSAGE EXISTS IN MESSAGE QUEUE |
| OUT_EMPTY | AGENT DOES NOT EXISTS IN CACHE, AND MESSAGE QUEUE IS EMPTY |
| MAX_PRI_FILLED | HAVING MESSAGE AT HIGHEST PRIORITY LEVEL |

CONTROL BLOCK MANAGEMENT STRUCTURE
OF THIS INVENTION

PROCESSING MESSAGES OF AGENTS

CROSS REFERENCE TO RELATED APPLICATION

This application is a continuation of U.S. application Ser. No. 11/319,893, Filed on Dec. 28, 2005, now U.S. Pat. No. 7,421,703, the contents of which are incorporated herein by reference.

FIELD OF THE INVENTION

The present invention relates to a message processing apparatus, a message processing method and a message processing program, which process messages of a large number of agents.

BACKGROUND OF THE INVENTION

In recent years, there has arisen the need for a system which processes a large number of agents in a short time. Examples include a system which supplies respective agents prepared for users with information matched with the respective tastes of the users at stations of a railroad or the like. In this service, when a previously registered user passes through an automatic ticket gate of a station, information concerning the vicinity of the station is searched for according to the taste of the user and transmitted to a mobile terminal or the like of the user. In this service, users who pass through automatic ticket gates at all stations of a railroad line can become targets. With an increasing number of users who pass through automatic ticket gates at the same time, there arises a necessity to process messages of a large number of agents in a short time.

According to Japanese Patent Laid-open No. 2004-192047, in order to efficiently process messages of a large number of agents, an agent having a message at a high priority level is processed preferentially over other agents. Further, respective agents prepared for customers are also differentiated and processed depending on priority levels matched with the customers. Moreover, for agents managed in a database, agents are cached in a system memory in order to reduce the access load on the database. After all messages stored in a message queue have been processed for each agent or after an upper limit of the number of messages consecutively processed has been exceeded, the next agent starts being processed. Thus, access to the database is minimized. That is, messages are processed according to the priority levels of agents and messages in such a manner that agents existing in the cache memory are given high priority and that messages of one agent are consecutively processed, whereby the number of times of accessing the database is attempted to be reduced and the processing of messages is attempted to be accelerated.

In the technology of the above-described Japanese Patent Laid-open No. 2004-192047, an agent having a message at a high priority level is preferentially processed. However, in the processing of messages, in order to reduce the number of times of accessing the database, not only messages at high priority levels but also messages at low priority levels are consecutively processed for one agent. Accordingly, only after the messages at low priority levels have been processed, messages at high priority levels of the next agent are processed. If there are a large number of agents having both of messages at high priority levels and messages at low priority levels, messages at high priority levels and messages at low priority levels are processed for each agent. Accordingly, the processing of a message at a high priority level of an agent processed later is considerably delayed because the processing of messages at low priority levels interrupt.

For example, in station vicinity information delivery services, delay problems are pointed out. A station vicinity information delivery service means a service in which advertisement or traffic information concerning the vicinity of a station, which matches with an information category previously registered by a user, is transmitted from an agent to a mobile phone or the like of the user when a commutation ticket is inserted into an automatic ticket gate. In the case where such a service is provided, there are restrictions on time, places, and taste information, such as the restrictions: that advertisement information or traffic information must reach its destination within a time in which the movement of the user from a station is small; and that the contents of information must correspond to taste information or the like concerning each user. The service must be provided for many users under conditions in which these are satisfied. An agent which performs these processes exists for each user, and performs a process for registering new advertisement information to be delivered to the user in addition to information delivery. Further, advertisements need to be filtered, when being registered, according to subscription information concerning each user. However, there is a necessity, when an automatic ticket gate is passed through, to avoid a heavy process in which a database is searched and customized for each user every time. Accordingly, each user has advertisement information and the like to be delivered. Further, in this service, high speed is required for an information delivery process performed when a user passes through an automatic ticket gate, but less required for a process such as a process for registering advertisement information for each user.

Moreover, similar delay problems can also occur in a service or the like: in which position information concerning a user is obtained using a GPS or the like built in a mobile phone of the user; and in which information is delivered to the mobile phone in response to a request from the user depending on the time, place, and taste of the user in a pinpoint manner. That is, in a crowded shopping mall or a tourist spot, in addition to processes for registering and delivering shop advertisement information, there can be processes for registering and delivering seat availability information concerning a restaurant or a cafe in response to a request from the user. In this case, a process for delivering information to the user needs to be performed within a time in which the user does not so much move from a place where the user has requested the information, and requires high speed. On the other hand, in a registration process, high speed is relatively required for seat availability information concerning a restaurant or a cafe. However, high speed is not required for a process for registering advertisement information concerning a sale starting in the next month.

However, in the case where the technology of the aforementioned Japanese Patent Laid-open No. 2004-192047 is adopted, a long delay is generated when advertisement information matching with a wide range of categories of users is registered. A description below will be given with a focus on a station vicinity information delivery service. However, this is one example but not intended to limit the scope of application of the present invention to a station vicinity information delivery service.

That is, in a station vicinity information delivery service, after an information delivery process performed a task regarding a user has passed through an automatic ticket gate, an agent subsequently performs an advertisement registration process. Considering that a plurality of automatic ticket gates are operating at all stations of a railroad line, many users are considered to pass through automatic ticket gates at about the same time. In some cases, information delivery from a user's agent processed further later may be significantly delayed by advertisement registration processes performed by agents of other users.

Supposing that an advertisement is delivered during evening rush hours in this station vicinity information delivery service, simple calculations are performed for the following specific case:

The number of automatic ticket gates is assumed to be 500 by assuming that the average number of automatic ticket gates per station is 10 and that the number of stations is 50, and users of this service is assumed to be 10% of all users.

The cache size for agents is assumed to be 50% of the total number of agents.

All automatic ticket gates are assumed to be fully operating because of busy time.

It is assumed that when a user enters an automatic ticket gate, the user passes in one second, and a next user starts entering immediately.

It is assumed that one advertisement is registered in relation to each of 25 stations, which are half of all stations, and that half of all users have become targets to whom the registered advertisements are to be delivered.

As for a time for processing an agent for the case where a system is fully operating, in a situation in which a plurality of agents are being processed in parallel at the same time, the CPU time of an agent relating to passage through an automatic ticket gate is assumed to be 18 ms in the case where the agent exists in a cache; the CPU time of an agent relating to passage through an automatic ticket gate is assumed to be 21 ms in the case where the agent does not exist in the cache; and the CPU time of an agent relating to advertisement information registration is assumed to be 20 ms in the case where the agent exists in the cache.

There are the following four patterns of agent processing:

A) an agent which exists in the cache and is a target of an advertisement registration process B) an agent which exists in the cache and is not a target of an advertisement registration process C) an agent which does not exist in the cache and is a target of an advertisement registration process D) an agent which does not exist in the cache and is not a target of an advertisement registration process Since the cache size is 50% and agents which become targets of advertisement registration processes are half of all agents, the number of agents of each pattern is 12.5 out of the number of agents (50 agents because 500 persons pass through automatic ticket gates per second and 10% of them are members) processed in one second. Here, an automatic ticket gate passage process is desired to be processed preferentially over an advertisement registration process. Accordingly, the priority level of a message indicating passage through an automatic ticket gate is set to one higher than that of a message indicating an advertisement registration request. An agent scheduler selects an agent existing in the cache, executes an automatic ticket gate passage process for it, and subsequently executes an advertisement registration process for the agent. When agents waiting messages indicating passage through automatic ticket gates have disappeared from the cache, an agent not existing in the cache is read into the cache, an automatic ticket gate passage process is executed, and subsequently an advertisement registration process for the agent is executed.

The time required for completing the processing of all agents existing in the cache is $$12.5 \times 18 \text{ ms} + 12.5 \times (18 \text{ ms} + 20 \text{ ms}) = 700 \text{ ms},$$

and the time required for completing the processing of all agents not existing in the cache is $$12.5 \times 21 \text{ ms} + 12.5 \times (21 \text{ ms} + 20 \text{ ms}) = 775 \text{ ms}.$$

The sum of these is 1475 ms, which exceeds one second by 475 ms. When one second is exceeded, a next user enters an automatic ticket gate, and therefore new messages indicating passage through automatic ticket gates reach the system one after another. Then, the agent scheduler again processes agents existing in the cache. The processing of agents (these are agents not existing in the cache) not processed in previous one second is postponed. Since users pass through automatic ticket gates one after another, agents left unprocessed are accumulated. This means that the advertisement does not reach some users. As described above, a process requiring quick response cannot be processed in an appropriate time in a situation in which messages at various priority levels are mixed.

SUMMARY OF THE INVENTION

Accordingly, an aspect of the present invention is to provide a message processing apparatus, a message processing method, and a message processing program which process messages of a large number of agents and which can solve the above-described problems.

In order to solve the aforementioned problems, the present invention provides an apparatus including: a memory; means for managing a state of an agent based on whether the agent is in the memory and whether there is a message, by determining a priority level of the agent based on a message inserted into the agent; means for assigning a thread to the agent if the agent is in the memory and for assigning a thread to the agent after calling the agent to the memory if the agent is not in the memory, on condition that the agent having a highest priority level has been detected; and message processing means for repeating message processing until a predetermined criterion is satisfied, in relation to the agent to which a thread has been assigned.

It is noted that the above-described summary of the invention does not list all features necessary for the present invention and that subcombinations of these features can also be included in the present invention.

BRIEF DESCRIPTION OF THE DRAWINGS

For a more complete understanding of the present invention and the advantage thereof, reference is now made to the following description taken in conjunction with the accompanying drawings, in which.

DETAILED DESCRIPTION OF THE INVENTION

The present invention provides message processing apparatus, message processing methods, and message processing programs which process messages of a large number of agents.

In an example embodiment, the present invention provides an apparatus including: a memory; means for managing a state of an agent based on whether the agent is in the memory and whether there is a message, by determining a priority level of the agent based on a message inserted into the agent; means for assigning a thread to the agent if the agent is in the memory and for assigning a thread to the agent after calling the agent to the memory if the agent is not in the memory, on condition that the agent having a highest priority level has been detected; and message processing means for repeating message processing until a predetermined criterion is satisfied, in relation to the agent to which a thread has been assigned.

An agent having a message at a high priority level is assigned a thread, and the agent processes messages until the predetermined criterion is satisfied, whereby the processing of a message at a high priority level is accelerated while the number of times of accessing a database (disk) is reduced.

Hereinafter, the present invention will be described by way of particular embodiments of the invention. However, the embodiments below are not intended to limit the invention, and all of combinations of features described in the embodiments are not necessarily indispensable for implementing the invention.

Figure 1:
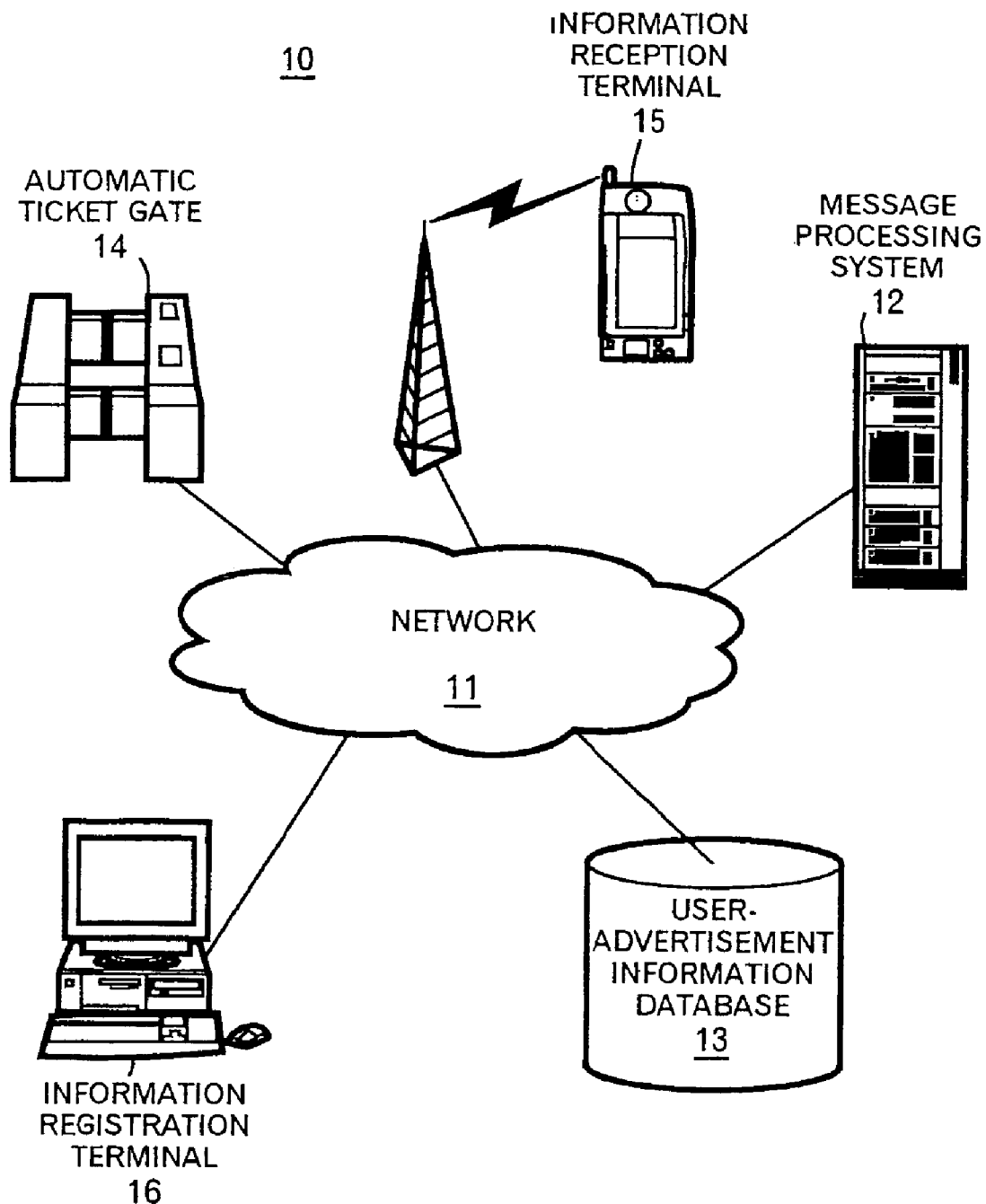
FIG. 1 shows a schematic diagram of a message processing system.

FIG. 1 shows an example for the case where the present invention is applied to a station vicinity information delivery service. A configuration 10 shows the outline of service provision. A network 11 is a communication network including the Internet, telephone lines, and others. A message processing system 12, a user-advertisement information database 13, a station's automatic ticket gate 14, an information reception terminal 15, and an information registration terminal 16 according to the present invention transmit and receive data and various kinds of information to and from each other through the network 11. Triggered by the passage of a user through the station's automatic ticket gate 14 or other things, the message processing system 12 detects, in the user-advertisement information database 13, advertisement information optimized for each user, and delivers the detected advertisement information as delivered information to the relevant information reception terminal 15. Further, the information registration terminal 16 is intended to register station vicinity information such as traffic information and advertisement information. This station vicinity information is selected and edited for each user by the message processing system 12, and registered in the user-advertisement information database 13.

Each user registers keyword(s) relating to the user's own taste and to things of particular interest to the user in advance. Examples of keyword(s) include "PCs and peripheral devices," "furniture," "flowers," "clothes," and "accessories." On the other hand, shops in the vicinities of stations along a railroad line register advertisement information. This advertisement information is screened according to the keyword(s) of each user, and registered in the user-advertisement information database 13 for each user. At the time of registration, advertisement information is also customized as needed for each user. When a user who has registered "clothes" as a keyword gets off a train and passes through a station's automatic ticket gate 14, information on that is transmitted to the message processing system. The user can be identified by recognizing a commutation ticket or the like having an ID attached thereto when the user passes through the station's automatic ticket gate. If there is advertisement information concerning clothes in relation to the station at which the user has gotten off, the message processing system 12 inserts a message into a queue of an agent of the relevant user based on event information. When this message has been processed by the agent, the user receives information on this using an information reception terminal 15. Information reception terminals 15 include mobile phones, PDAs, and notebook PCs, but are not limited to these as long as they have the function of receiving information.

Moreover, when an advertiser or the like inputs advertisement information from an information registration terminal 16, the information is transmitted to the message processing system 12. The message processing system 12 inserts a message into agent queues of users based on event information. For example, if the advertisement information relates to accessories, the advertisement information is to be registered in user records of the user-advertisement information database 13 in which the word "accessories" is registered as a keyword. To process this message is to register the advertisement information concerning accessories which is customized for each user. Further, in addition to advertisement information, traffic information and the like are also registered in the user-advertisement information database 13.

Figure 2:
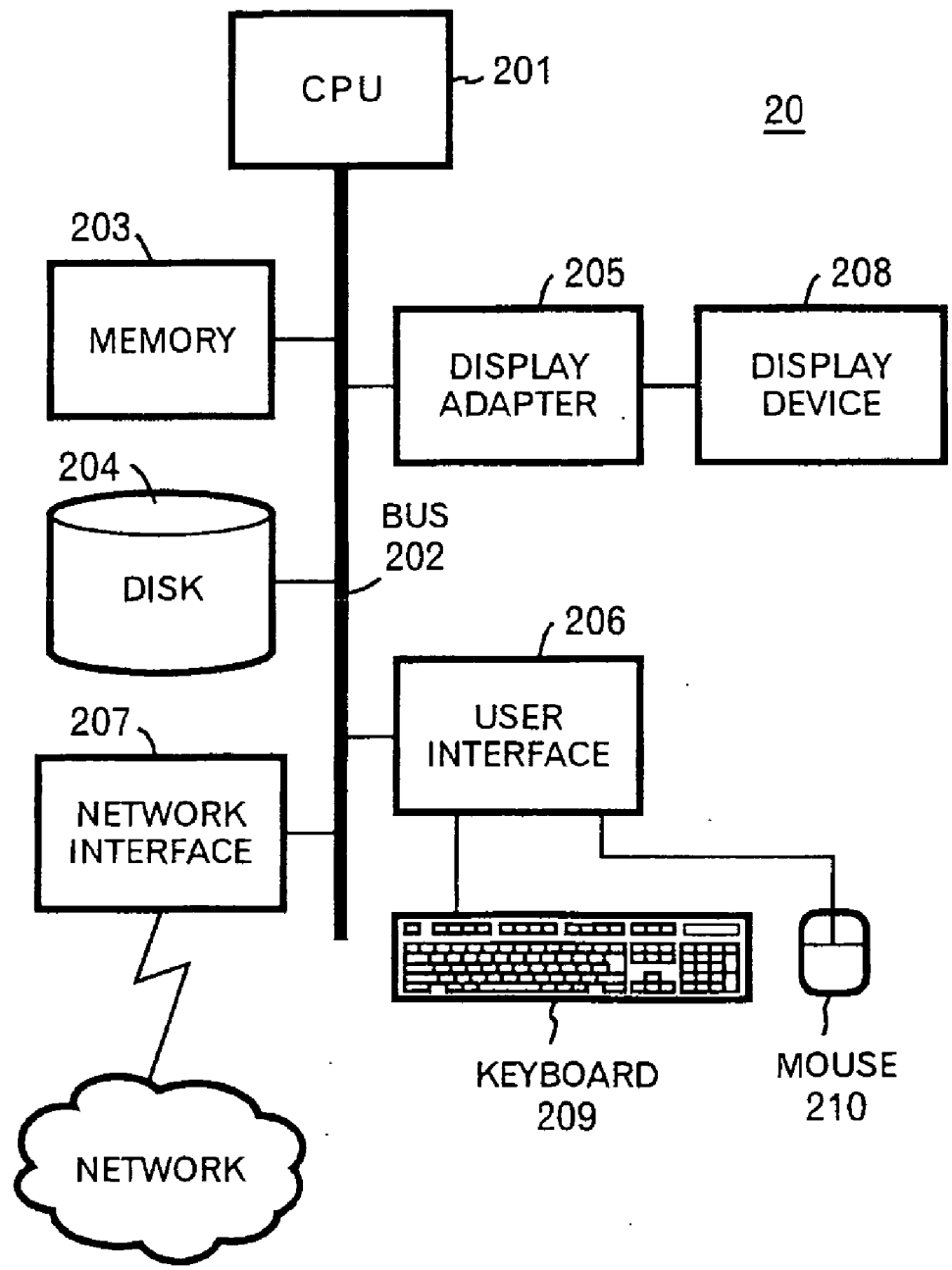
FIG. 2 shows one example of the hardware configuration of the message processing system.

FIG. 2 is the outline of the hardware configuration 20 of the message processing system. ACPU 201, which is a central processing unit, executes various programs under the control of various OSes. The CPU 201 is interconnected to a memory 203, a disk 204, a display adapter 205, a user interface 206, and a network interface 207 through a bus 202. The CPU 201 is connected to a keyboard 209 and a mouse 210 through the user interface 206, connected to a display device 208 through the display adapter 205, and connected to the network through the network interface 207. The memory 203 includes a primary memory and a cache memory. The cache memory is also used to cache an agent and a message. The hard disk 204 is used to register an agent database and a subscription table. This is merely an example of one embodiment of a computer system and a bus arrangement. Features of the present invention can be used in various system configurations, in embodiments having a plurality of identical components, and in embodiments dispersed on a network.

Figure 3:
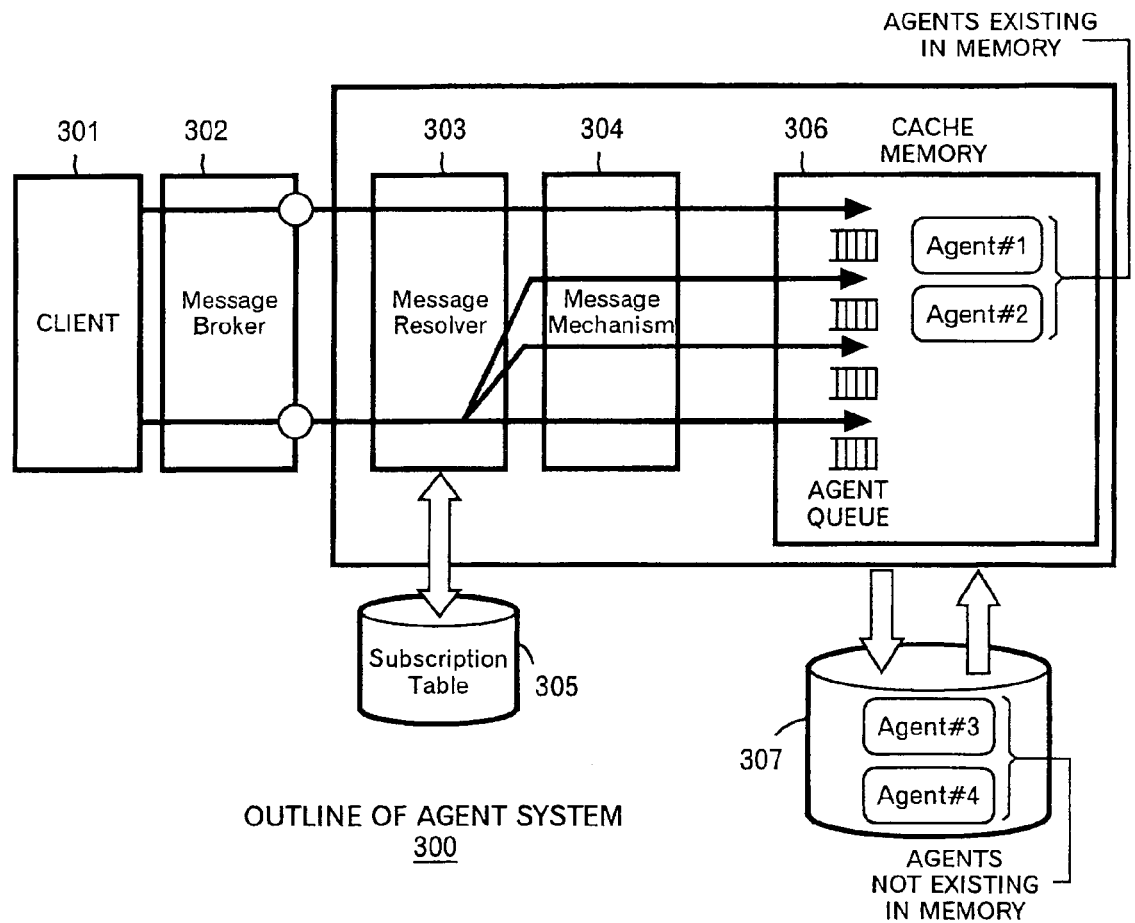
FIG. 3 shows one example of a schematic diagram of the message processing system.

FIG. 3 schematically shows an agent processing system 300; 301 is a client, 302 is a message broker, 303 is a message resolver, 304 is a message mechanism, 305 is a subscription table, 306 is a cache memory, and 307 is an agent database. The message broker 302 has the role of performing communication relating to exchanges of various kinds of information with the client, and event information is received by the message resolver 303. Then, the message resolver 303 detects agent information corresponding to the event information in the subscription table 305, and inserts a corresponding message into a message queue according to the agent information. Further, the agent processing system reads an agent into the cache memory 306, deletes an agent from the cache memory 306, and assigns a thread to an agent.

Figures 4, 5:
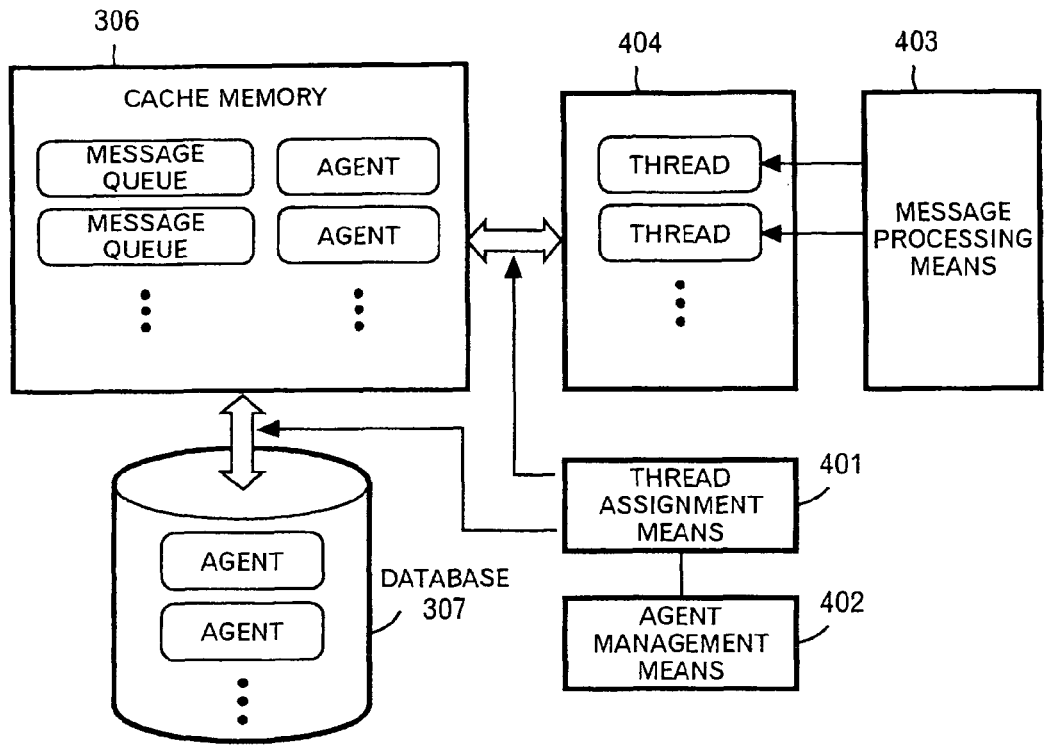
FIG. 4 shows one example of the functional configuration of the message processing system.
FIG. 5 shows examples of variable values representing the states of agents.

FIG. 4 schematically shows functions of a message processing apparatus. Thread assignment means 401 is directed by agent management means 402 to assign threads 404. Message processing means 403 processes messages of an agent until a predetermined criterion is satisfied. The thread assignment means 401 can not only assign a thread to an agent existing in the cache memory 306, but also call an agent from the database 307 to the cache memory to assign a thread to the agent. The agent management means 402 schedules thread assignment based on the priority levels of messages possessed by an agent and whether the agent is in the cache memory or not. A scheduling mechanism will be described in detail with reference to FIGS. 5 to 12.

Figure 6:
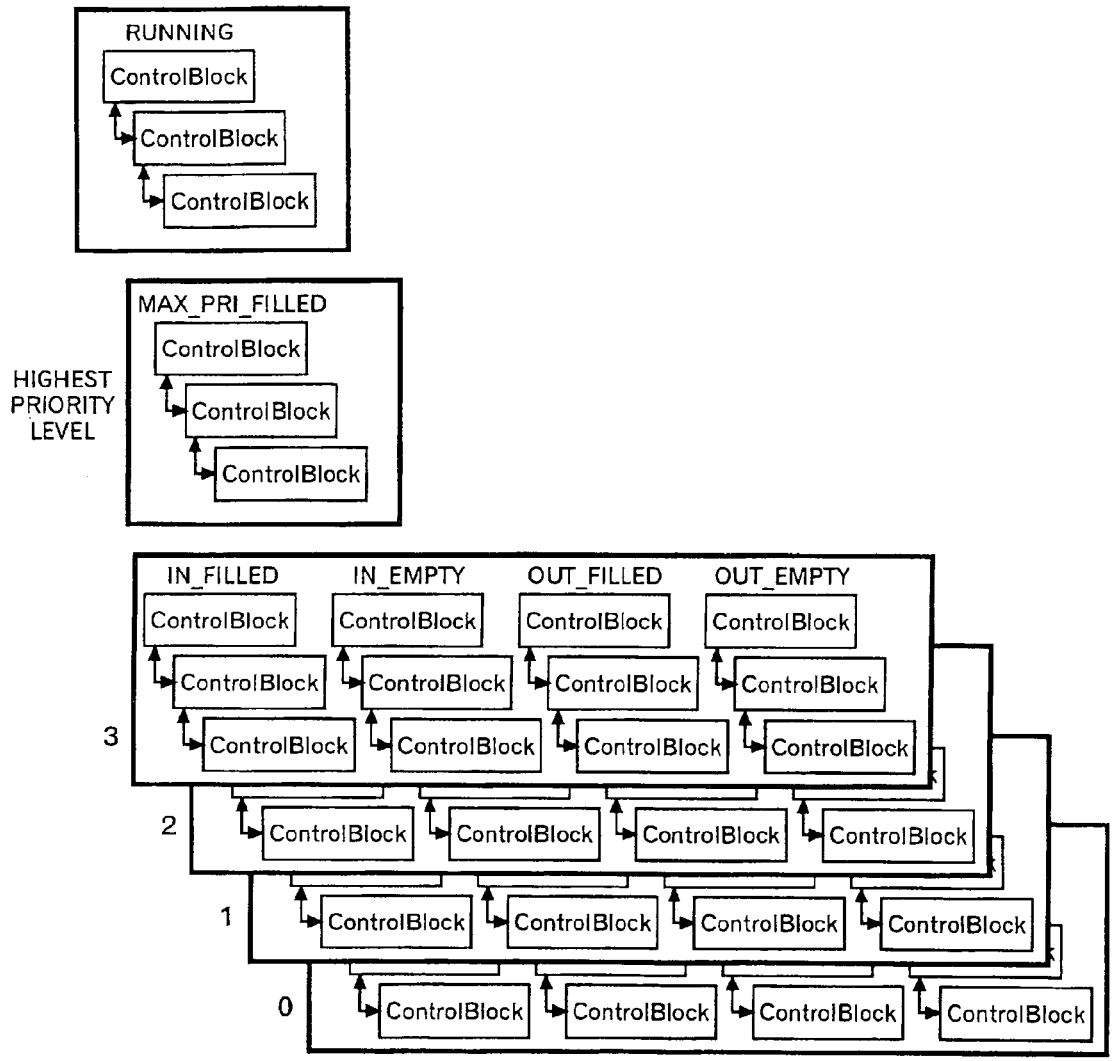
FIG. 6 shows one example of a mechanism for managing the priority level and state of an agent.

FIG. 5 shows as examples of variable values indicating the states of agents. These variable values are used in a mechanism for managing agents, which is shown in FIG. 6 and will be described later. Variables indicating the states of agents include RUNNING, IN_FILLED, IN_EMPTY, OUT_FILLED, OUT_EMPTY, and MAX_PRI_FILLED. RUNNING indicates that an agent is assigned a thread. IN_FILLED indicates that an agent is in the cache memory and that there is a message in the message queue. IN_EMPTY indicates that an agent is in the cache memory and that the message queue is empty. OUT_FILLED indicates that an agent is not in the cache memory and that there is a message in the message queue. OUT_EMPTY indicates that an agent is not in the cache memory and that the message queue is empty. MAX_PRI_FILLED indicates that an agent has a message at the highest priority level.

FIG. 6 shows a mechanism for managing a state depending on the priority levels of messages possessed by an agent. Taken as an example is the case where there are priority levels of 0 to 3 and further there is MAX_PRI_FILLED, which is the highest priority level higher than 3. For the priority levels of 0 to 3, there are RUNNING, IN_FILLED, IN_EMPTY, OUT_FILLED, and OUT_EMPTY. For MAX_PRI_FILLED, no distinction is made between IN and OUT as to the memory. The purpose of this is to set the state of an agent to MAX_PRI_FILLED and give high priority of processing to the agent in the case where the agent has a message at the highest priority level regardless of whether the agent exists in the memory or not.

Figure 7:
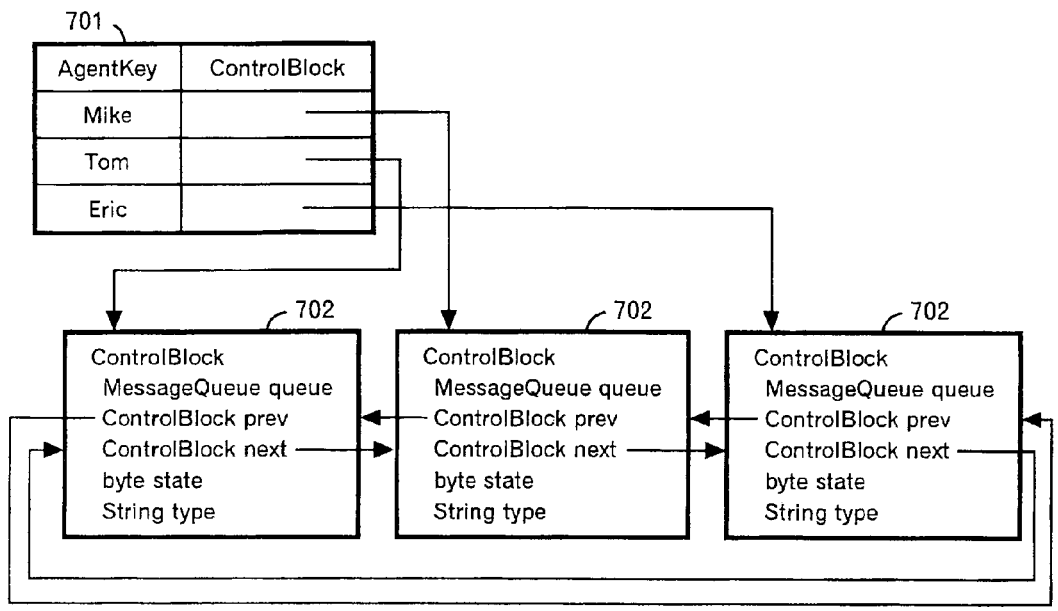
FIG. 7 shows one example of the data structure of a control block (ControlBlock)

FIG. 7 shows the data structure of a control block (ControlBlock) of FIG. 6. A table 701 shows a one-to-one correspondence between an agent key (AgentKey) and a control block. Agent keys are intended to identify agents, and correspond to respective delivery destinations (users) in a one-to-one relationship. In the table 701 of FIG. 7, agent keys are represented by personal names (Mike, Tom, and Eric). Each control block 702 contains "MessageQueue queue," "ControlBlock prev," "ControlBlock next," "byte state," and "String type." "MessageQueue queue" represents data concerning a message queue to which it is related to. "ControlBlock prev" represents data concerning the preceding control block to which it is coupled. "ControlBlock next" represents data concerning the subsequent control block to which it is coupled. "byte state" represents the state (IN_FILLED, IN_EMPTY, or the like) in which it currently stays. "String type" represents data of a string type.

Figure 8:
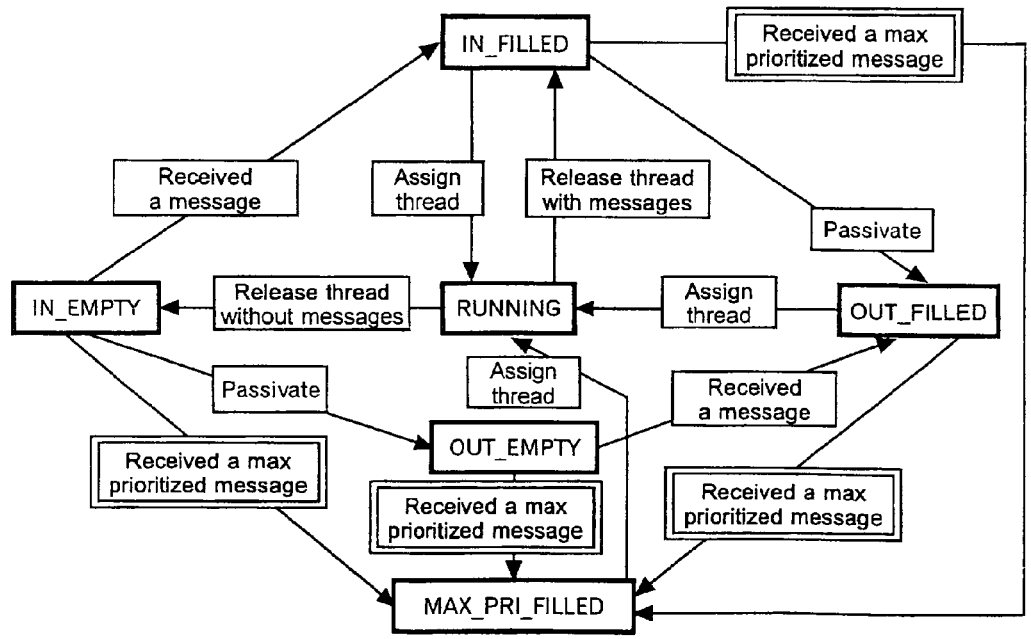
FIG. 8 shows one example of the state transition of an agent.

FIG. 8 shows the state transition of an agent. The state transition of an agent is updated based on this drawing. In this state transition, when the agent receives a message at the highest priority level in the state of IN_FILLED, IN_EMPTY, OUT_FILLED, or OUT_EMPTY, the state of the agent changes to MAX_PRI_FILLED. As soon as a thread becomes available, this agent is preferentially assigned the thread and changes to the RUNNING state.

Figure 9:
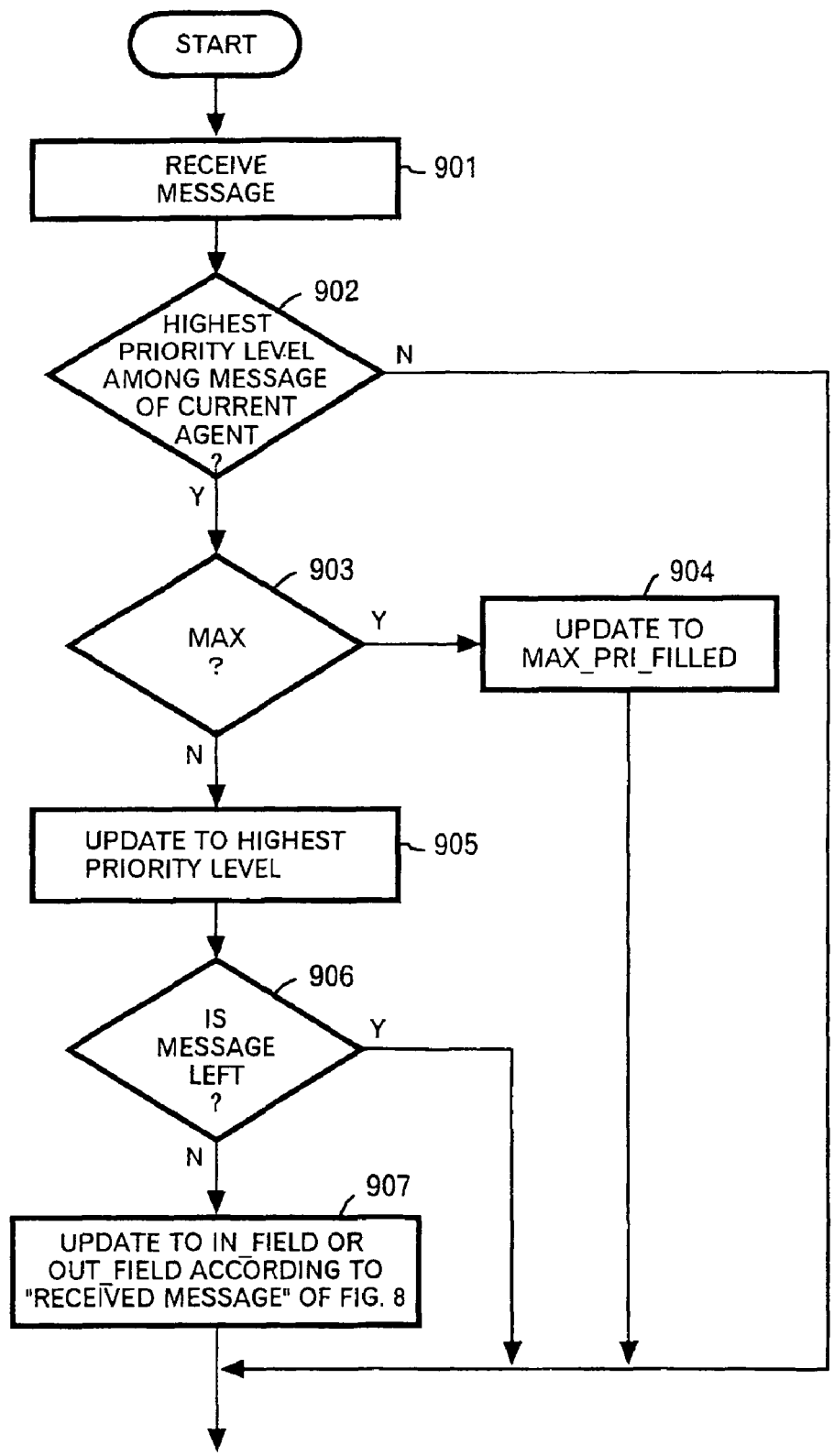
FIG. 9 shows one example of a flow for updating the state of an agent by inserting a message.

FIG. 9 shows a flow for updating the state of an agent by inserting a message. When a message is received in step 901, a determination is made in step 902 as to whether the received message is at the highest priority level among messages possessed by the agent. If a determination is made that the received message is not at the highest priority level, the update process exits. If a determination is made that the received message is at the highest priority level among the messages currently possessed by the agent, go to step 903. In step 903, a determination is made as to whether or not the priority level of the message is the highest. If the priority level is the highest, then, in step 904, the state of the agent is updated to MAX_PRI_FILLED indicating the highest priority level, a process for coupling control blocks is also updated, and the process exits. If the priority level is not the highest, the priority level of the received message is determined in step 905. At this time, a process for coupling control blocks is also updated. Next, in step 906, a determination is made as to whether or not the agent has had a message, i.e., whether or not the state is any one of OUT_FILLED and IN_FILLED of FIG. 8. If the agent has had a message, the state of the agent is updated to a state which is OUT_FILLED or IN_FILLED and which is depending on the priority level of the agent, a process for coupling control blocks is also updated, and the process exits. On the other hand, if the agent has not had a message, then, in step 907, the state of the agent is updated according to "Received Message" of FIG. 8 to a state which is OUT_FILLED or IN_FILLED and which is depending on the priority level of the agent, a process for coupling control blocks is also updated, and the process exits.

Figure 10:
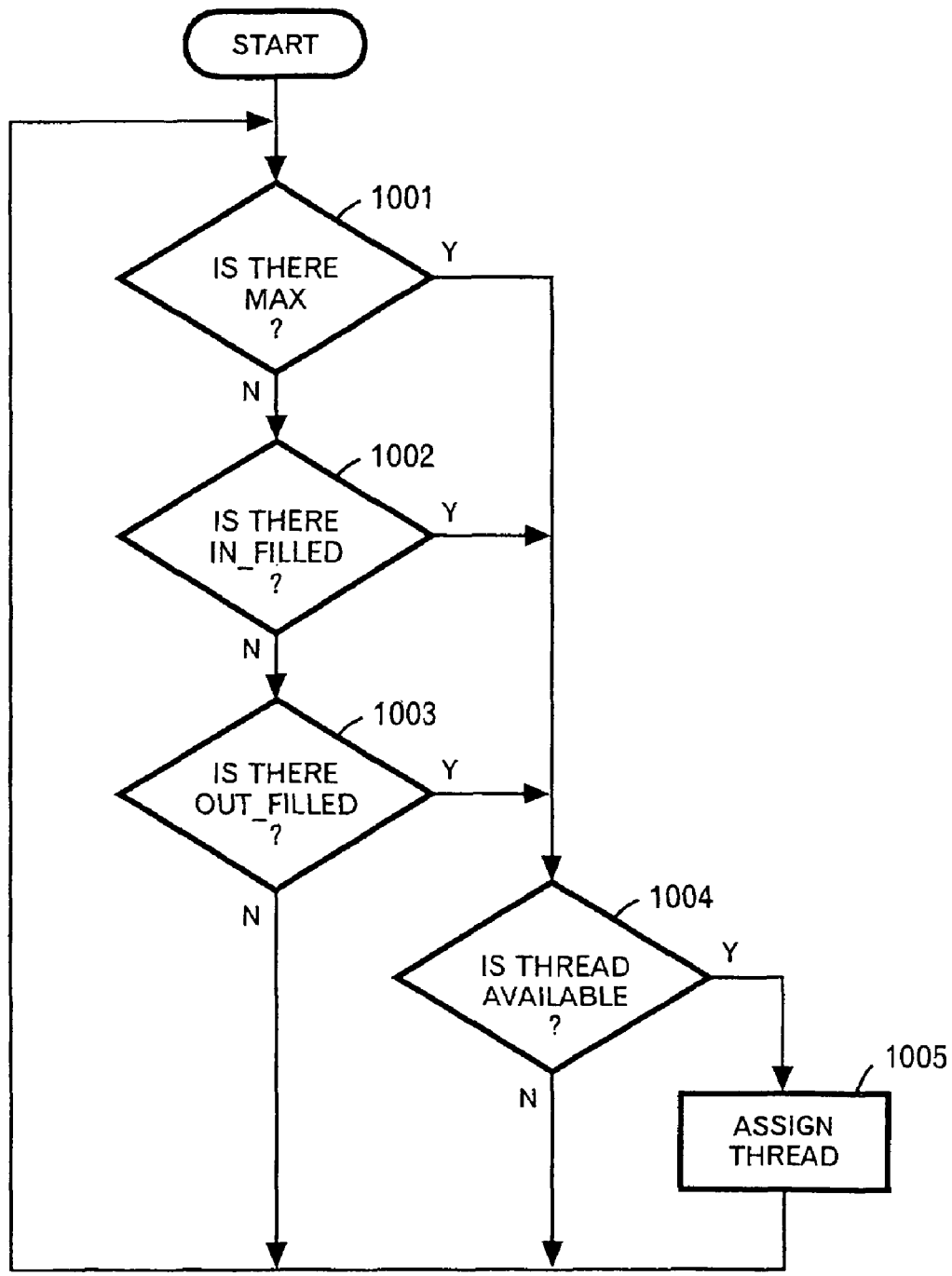
FIG. 10 is an operation flow showing one example of a flow for assigning a thread to an agent.

FIG. 10 shows a flow for assigning a thread to an agent. In step 1001, a determination is made as to whether there is an agent having a message of MAX_PRI_FILLED. If a determination is made that there is no such message, a determination is made in step 1002 as to whether there is a message of IN_FILLED. If a determination is made that there is no such message, a determination is made in step 1003 as to whether there is a message of OUT_FILLED. If a determination is made that there is no such message, go back to the start. In steps 1001, 1002, and 1003, a message most preferentially processed is one of MAX_PRI_FILLED, and one second most preferentially processed is a message possessed by an agent existing in the cache memory. That is, IN_FILLED is given high priority. The purpose of this is to reduce the number of times of calling agents to the cache memory and to reduce access to the database, as well as to process a message at a high priority level. Further, in the case where agents are in the same states in terms of whether or not they are in the cache memory, an agent having a message at a higher priority level may be preferentially assigned a thread. If a determination is made in steps 1001, 1002, and 1003 that there is an agent (Yes), a determination is made in step 1004 as to whether or not a thread is available. If a thread is available, the agent is assigned the thread in step 1005. Incidentally, if the agent is not in the cache memory, the agent is called to the cache memory and assigned the thread. If no thread is available, go back to the start. If no thread is available, the agent may wait until a thread becomes available and be assigned a thread.

Figure 11:
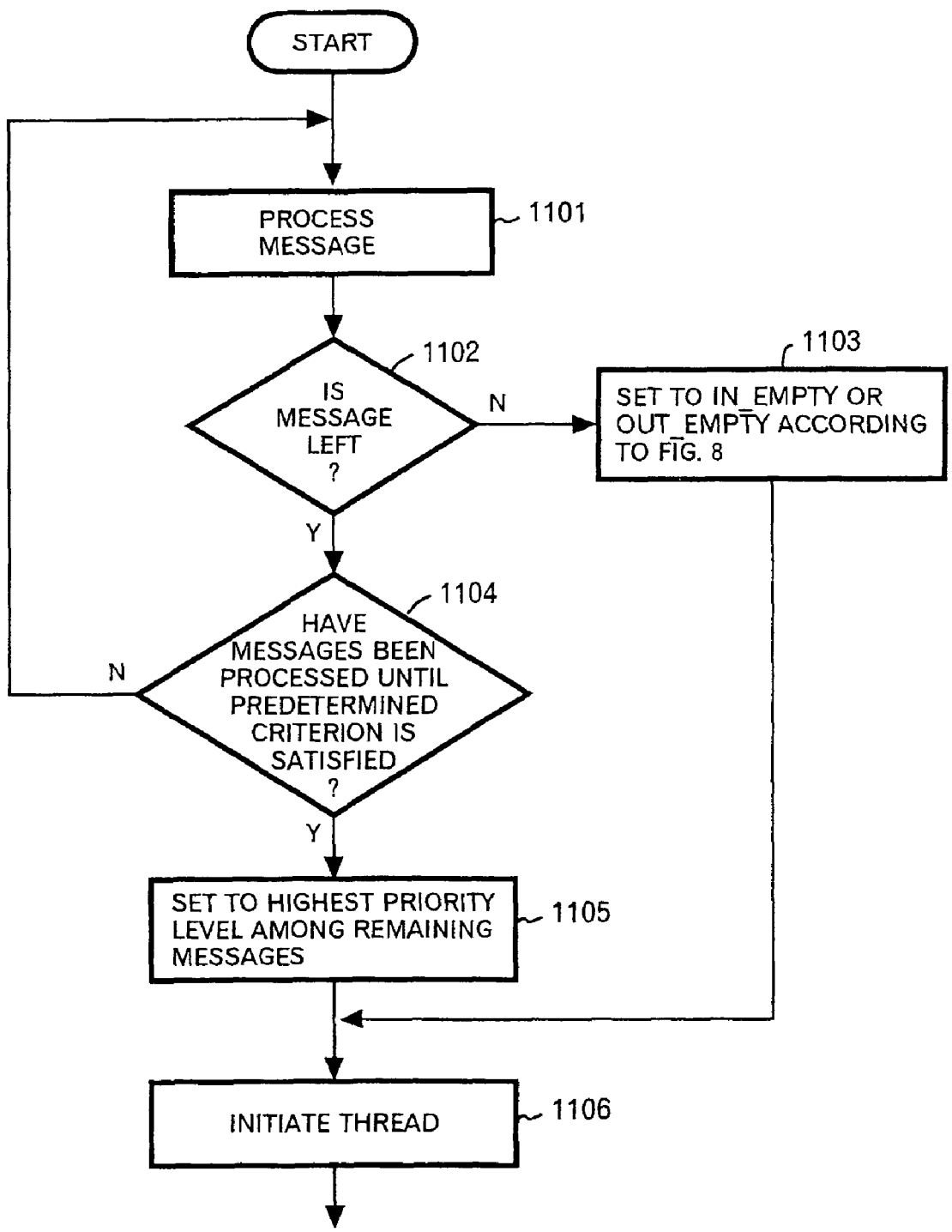
FIG. 11 shows one example of a flow for processing a message.

FIG. 11 shows a flow for processing a message. This process is performed after step 1005 of assigning a thread in FIG. 10. In step 1101, the agent processes messages. The messages are processed from a message at a higher priority level. In step 1102, a determination is made as to whether there remains an unprocessed message for the agent. If a determination is made that there remains no message, update to IN_EMPTY or OUT_EMPTY is performed in step 1103 according to the state transition of FIG. 8. After this, in step 1106, the thread is released. If a determination is made in step 1102 that there remains a message, then, in step 1104, a determination is made as to whether messages have been processed until a predetermined criterion is satisfied. The predetermined criterion is, for example, that the processing of all messages at the highest priority level which are possessed by the agent has been completed, the number of messages consecutively processed per agent, and that all messages at priority levels of two or more are processed. This processing criterion may be dynamically changed depending on the number of unprocessed messages remaining in a message queue, or a situation such as commuting hours. If a determination is made in step 1104 that messages have not been processed until the predetermined criterion is satisfied, go back to step 1101 in order to repeat message processing. On the other hand, if a determination is made that messages have been processed until the predetermined criterion is satisfied, then, in step 1105, the agent is updated to the highest priority level among the remaining messages. Then, in step 1106, the thread is released.

Figure 12:
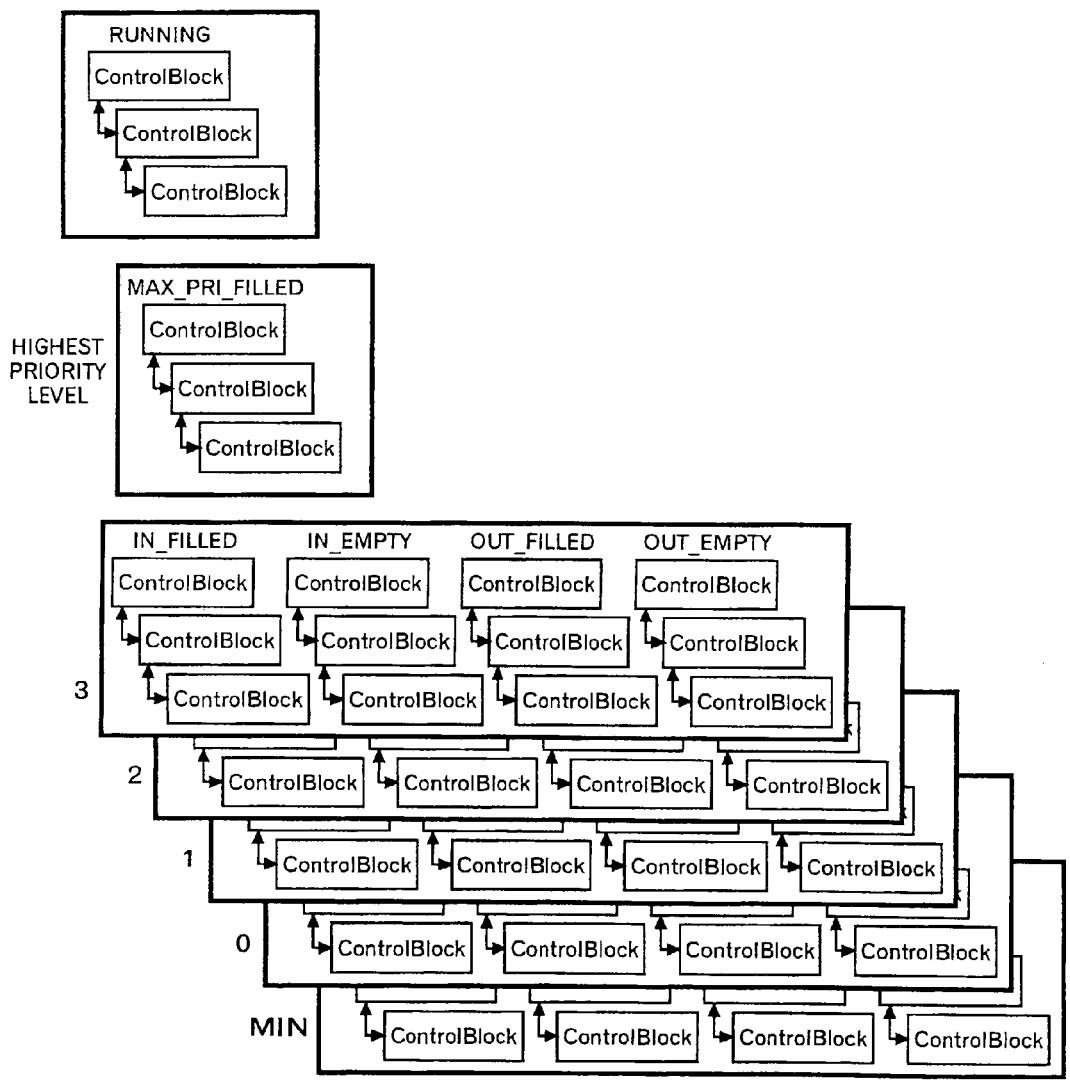
FIG. 12 shows one example of a modified example of the mechanism for managing the priority level and state of an agent.

FIG. 12 is a modified example of the mechanism for managing the priority level and state of an agent which is shown in FIG. 6. In FIG. 6, priority levels are 0 to 3 and the highest priority level MAX_PRI_FILLED. Meanwhile, in FIG. 12, shown is the case where there is also the lowest priority level MIN. In this case, messages of the agent are consecutively processed. If the message to be processed next is at the lowest priority level MIN, messages of the agent are not processed. The priority level of the agent is set to MIN, and other agents are processed. In step 1105 in FIG. 11, the processing of messages at priority levels above MIN is set as the predetermined criterion. Thus, the processing of the agent having a message at a higher priority level is accelerated. Incidentally, at the lowest priority level MIN, as in other priority levels 0 to 3, there are the states IN_FILLED, IN_EMPTY, OUT_FILLED, and OUT_EMPTY.

Although the present invention has been described above using an embodiment, the technical scope of the present invention is not limited to the scope described in the embodiment. It is apparent to those skilled in the art that various modifications and improvements can be made to the above-described embodiment. It is apparent from the description of the scope of claims that embodiments to which such modifications and improvements are made can also be included in the technical scope of the present invention.

Although the advantageous embodiments of the present invention have been described in detail, it should be understood that various changes, substitutions and alterations can be made therein without departing from spirit and scope of the inventions as defined by the claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An apparatus comprising:
   a memory;
   means for managing a state of an agent based on whether the agent is in the memory and whether there is a message, by determining a priority level of the agent based on the message inserted into the agent;
   means for assigning a thread to the agent if the agent is in the memory and for assigning a thread to the agent after calling the agent to the memory if the agent is not in the memory, on condition that the agent having a highest priority level has been detected; and message processing means for repeating message processing until a predetermined criterion is satisfied, in relation to the agent to which a thread has been assigned.

2. The apparatus according to claim 1, wherein the means for assigning a thread further assigns a thread to an agent existing in the memory preferentially over an agent not existing in the memory, on condition that an agent having the highest priority level is not detected.

3. The apparatus according to claim 1, wherein the predetermined criterion is dynamically changed depending on a situation.

4. The apparatus according to claim 1, wherein the predetermined criterion is that a predetermined number of messages have been processed for one agent.

5. The apparatus according to claim 4, wherein the means for managing a state of an agent further comprises: means for determining, after the message has been processed, the priority level of the agent based on a most prioritized message of remaining messages.

6. The apparatus according to claim 1, wherein the predetermined criterion is that messages having priority levels except a lowest priority level have been processed.

7. A method for processing a message of an agent, comprising the steps of:

managing a state of an agent based on whether the agent is in the memory and whether there is a message, by determining a priority level of the agent based on a message inserted into the agent;

assigning a thread to the agent if the agent is in the memory and assigning a thread to the agent after calling the agent to the memory if the agent is not in the memory, on condition that the agent having a highest priority level has been detected; and repeating message processing until a predetermined criterion is satisfied, in relation to the agent to which a thread has been assigned.

8. The method for processing a message of an agent according to claim 7, wherein the step of assigning a thread further comprises: assigning a thread to an agent existing in the memory preferentially over an agent not existing in the memory, on condition that an agent having the highest priority level is not detected.

9. The method for processing a message of an agent according to claim 8, wherein in the step of assigning a thread, if agents are in the same state in terms of whether the agents exist in the memory, a message having a higher priority level is preferentially assigned a thread.

10. The method for processing a message of an agent according to claim 7, wherein the predetermined criterion is that a predetermined number of messages have been processed for one agent.

11. The method for processing a message of an agent according to claim 10, wherein the step of managing a state of an agent further comprises: the step of determining, after the message has been processed, the priority level of the agent based on a most prioritized message of remaining messages.

12. The method for processing a message of an agent according to claim 7, wherein the predetermined criterion is that messages having priority levels except a lowest priority level have been processed.

13. An article of manufacture tangibly embodying non-transitory computer readable instructions which when executed, cause a computer to carry out the steps of a method of processing a message of an agent, according to claim 7.

14. A method for processing a message of an agent, comprising the steps of:

determining whether the message of the agent has a highest priority level;

managing a state of the agent as being at the highest priority level, on condition that the message is at the highest priority level;

detecting an agent having the message at the highest priority level;

assigning a thread to the agent having the message at the highest priority level;

processing the message by the agent;

determining whether the agent has processed the messages until a predetermined criterion is satisfied; and releasing the thread on condition that the messages have been processed until the predetermined criterion is satisfied.

15. The method for processing a message of an agent according to claim 14, wherein the step of assigning a thread further comprises: assigning a thread preferentially to an agent existing in the memory on condition that only agents having priority levels except the highest priority level are detected.

16. The method for processing a message of an agent according to claim 15, wherein in the step of assigning a thread, if agents are in the same state in terms of whether the agents exist in the memory, a message having a higher priority level is preferentially assigned a thread.

17. The method for processing a message of an agent according to claim 14, wherein the predetermined criterion is that a predetermined number of messages have been processed for one agent.

18. The method for processing a message of an agent according to claim 17, wherein the step of managing a state of an agent further comprises: the step of determining, after the message has been processed, the priority level of the agent based on a most prioritized message of remaining messages.

19. The method for processing a message of an agent according to claim 14, wherein the predetermined criterion is that messages having priority levels except a lowest priority level have been processed.

20. An article of manufacture tangibly embodying non-transitory computer readable instructions which when executed, cause a computer to carry out the steps of a method of processing a message of an agent, according to claim 14.

* * * * *